E. LECOULTRE.
AUTOMATIC MACHINE FOR BLOWING GLASS.
APPLICATION FILED DEC. 27, 1919.
1,401,713.
Patented Dec. 27, 1921.
14 SHEETS—SHEET 4.
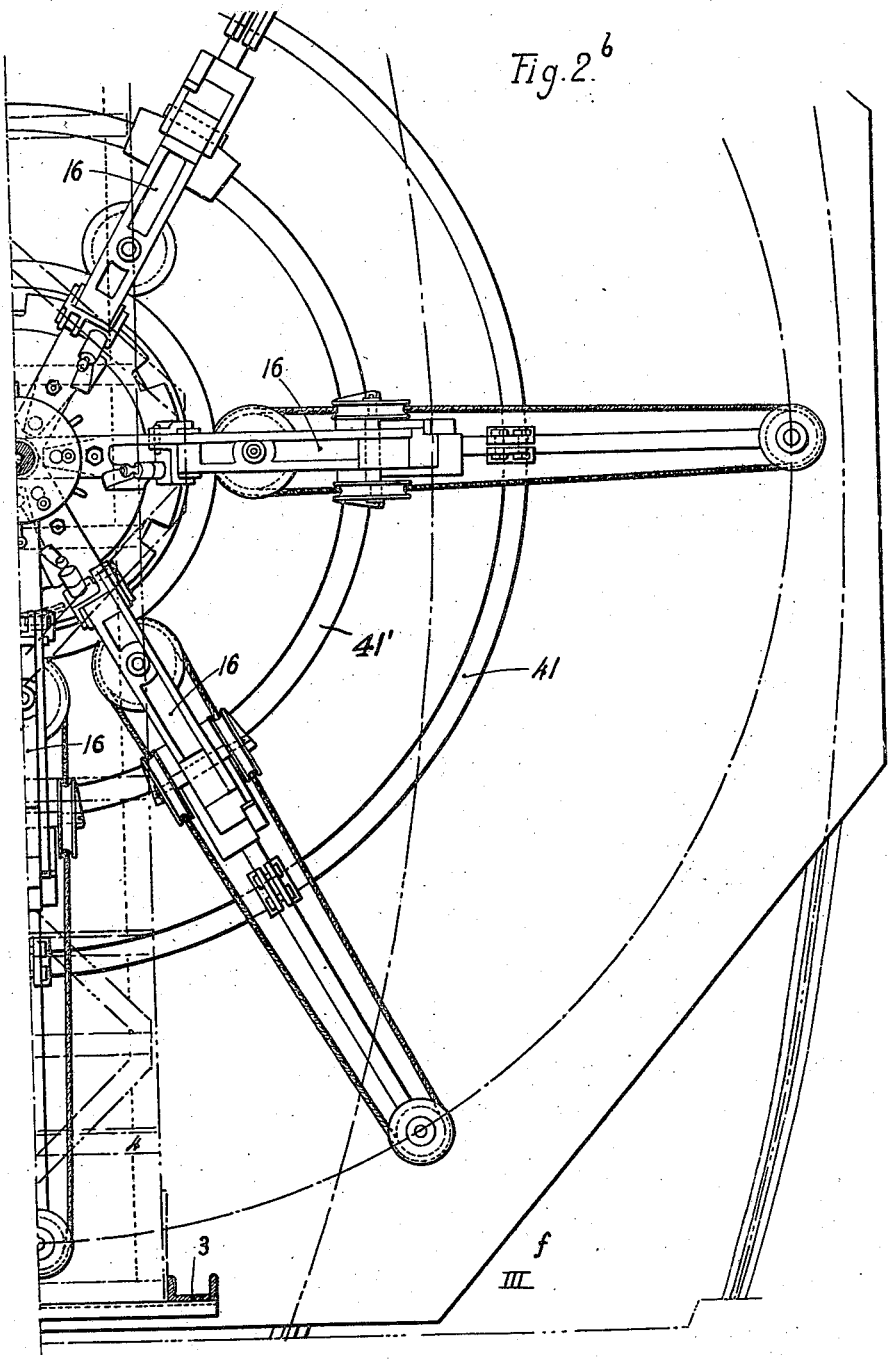
Fig. 2.6
Inventor.
Ernest Lecoultre
by Chas. J. O'Neill
Atty

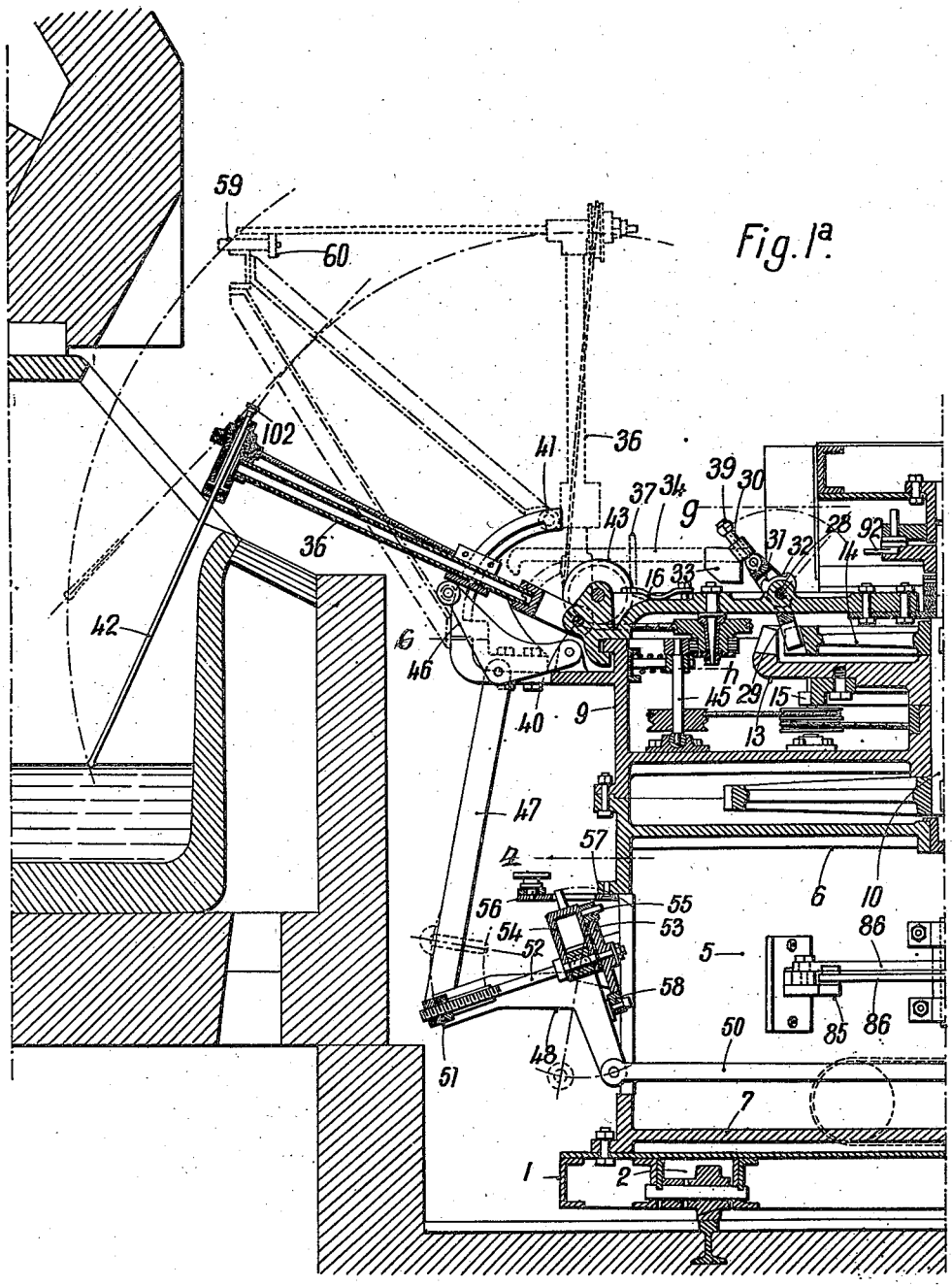

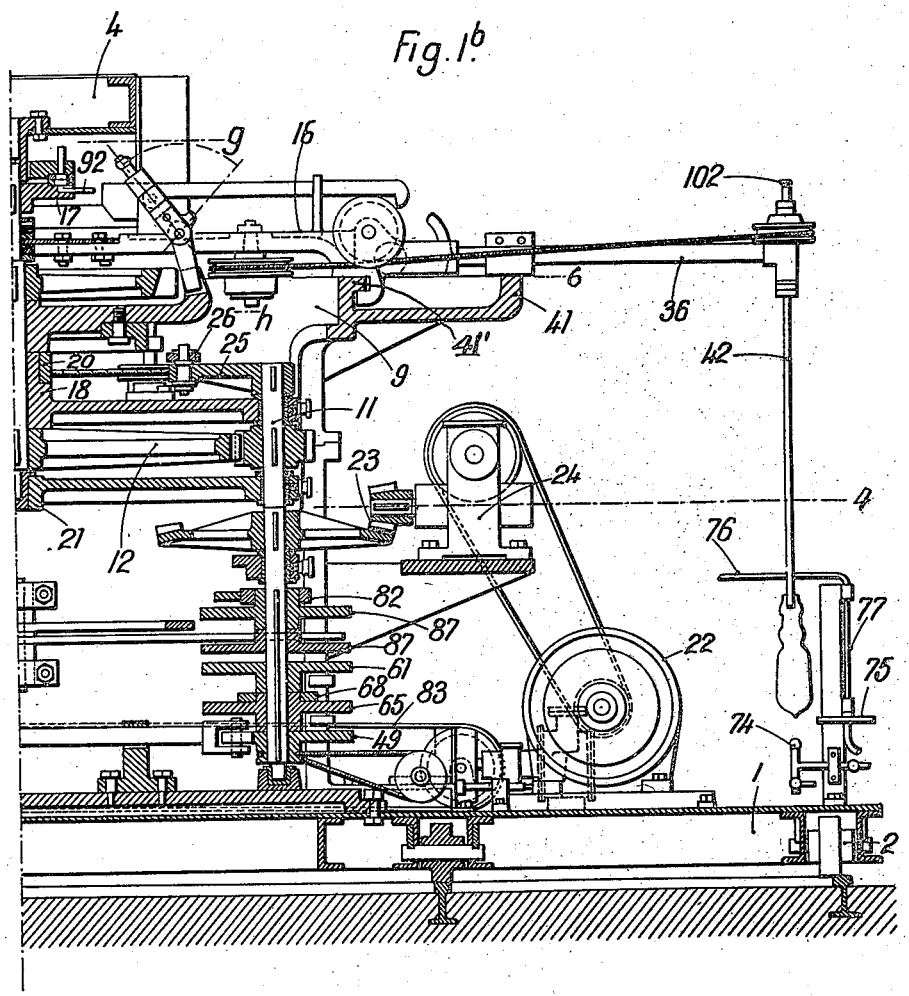

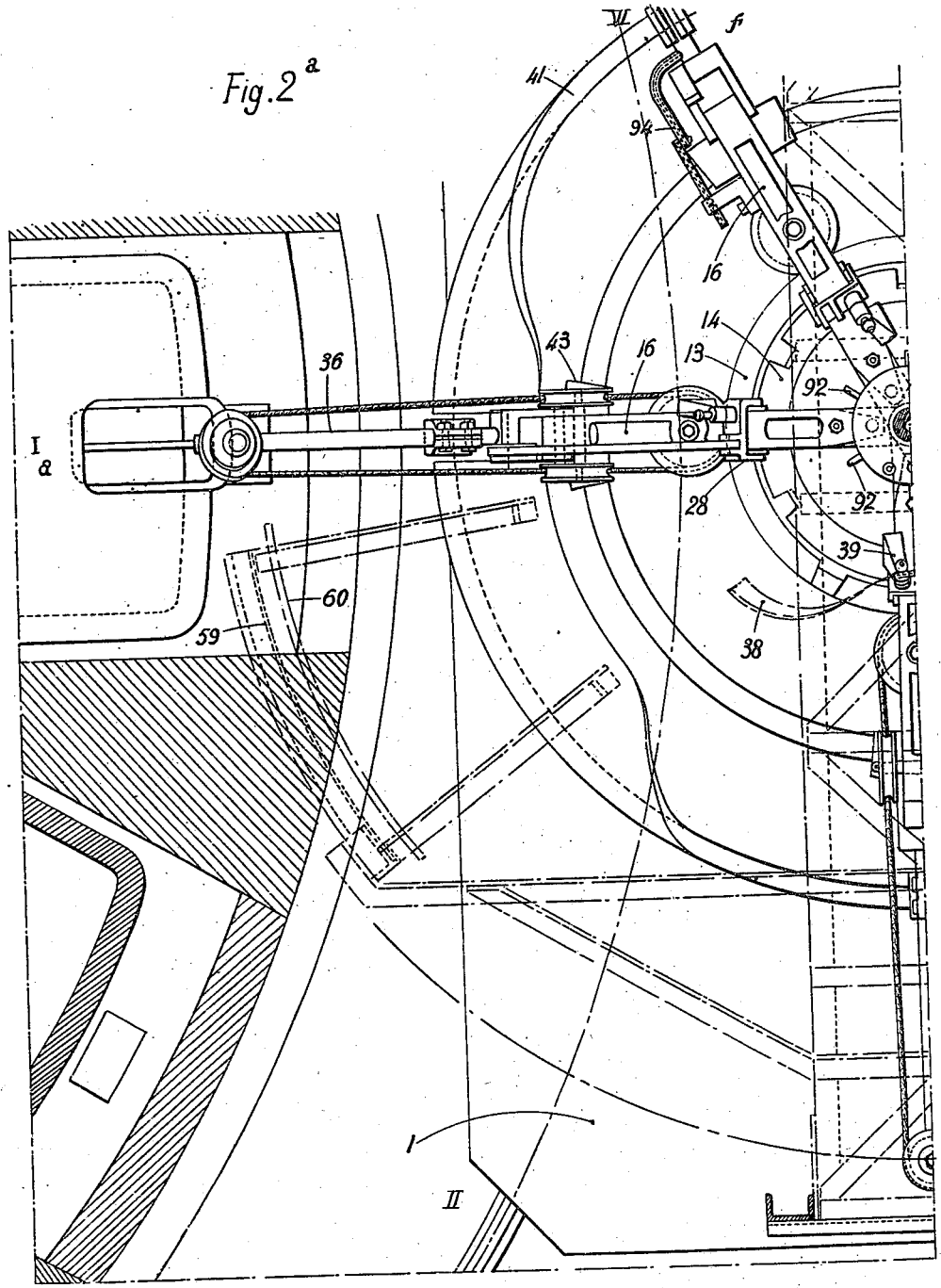

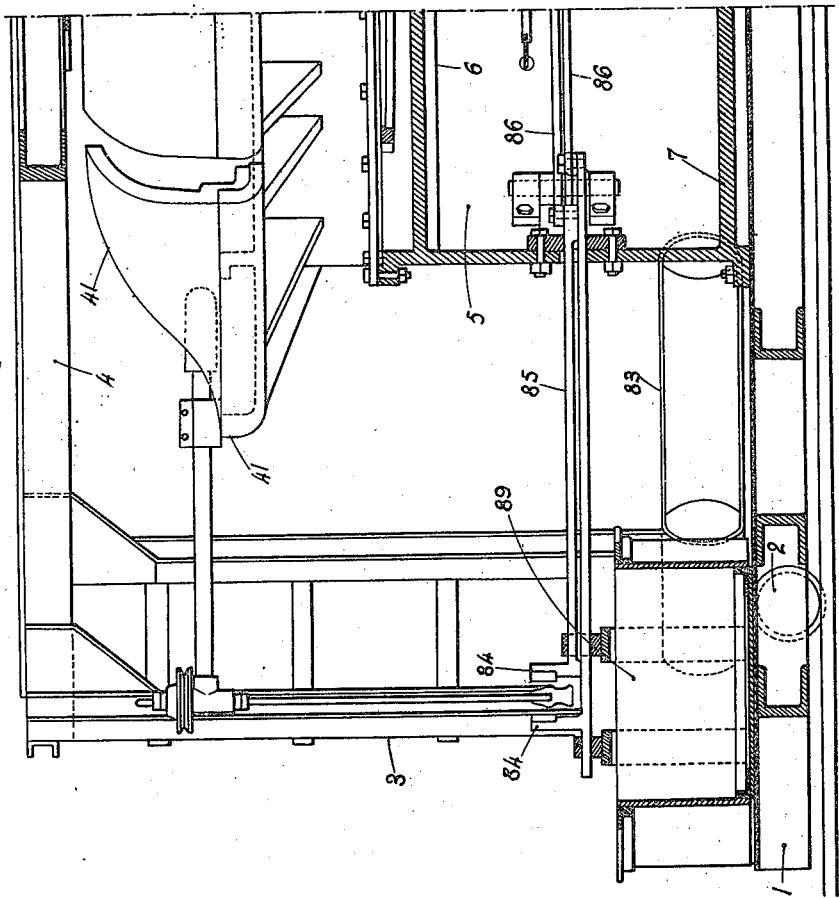

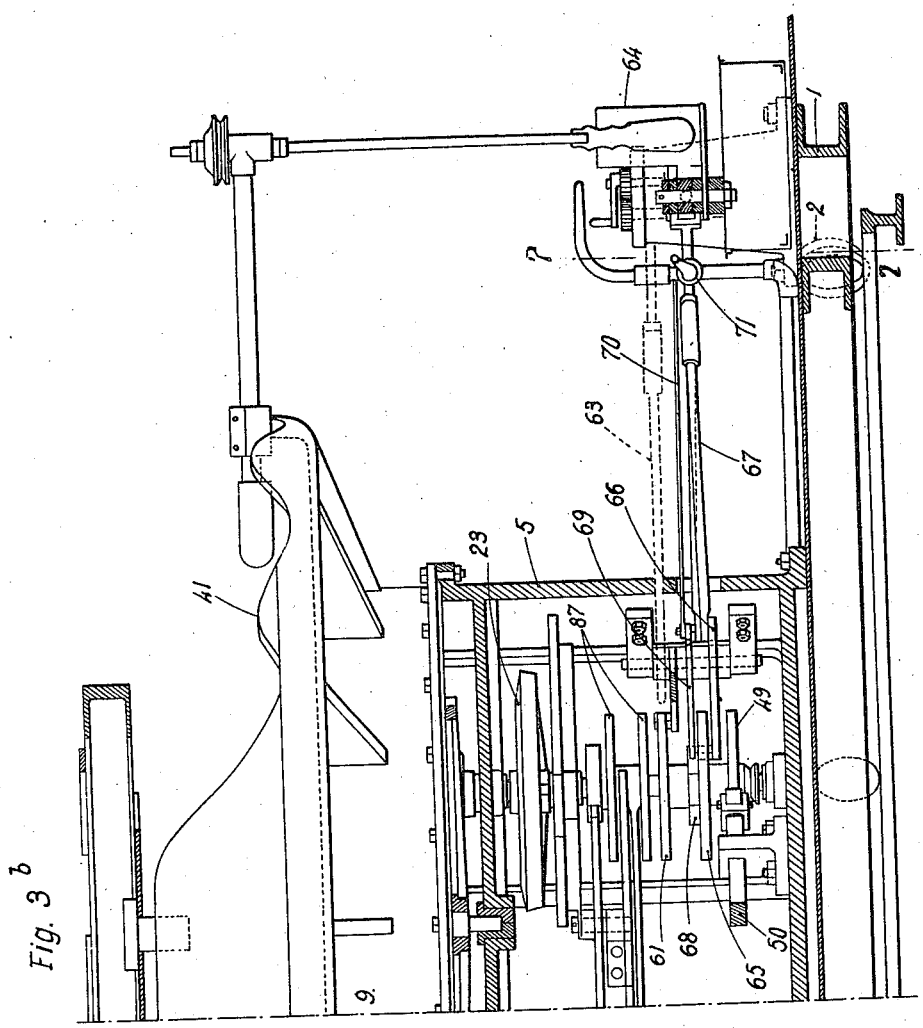

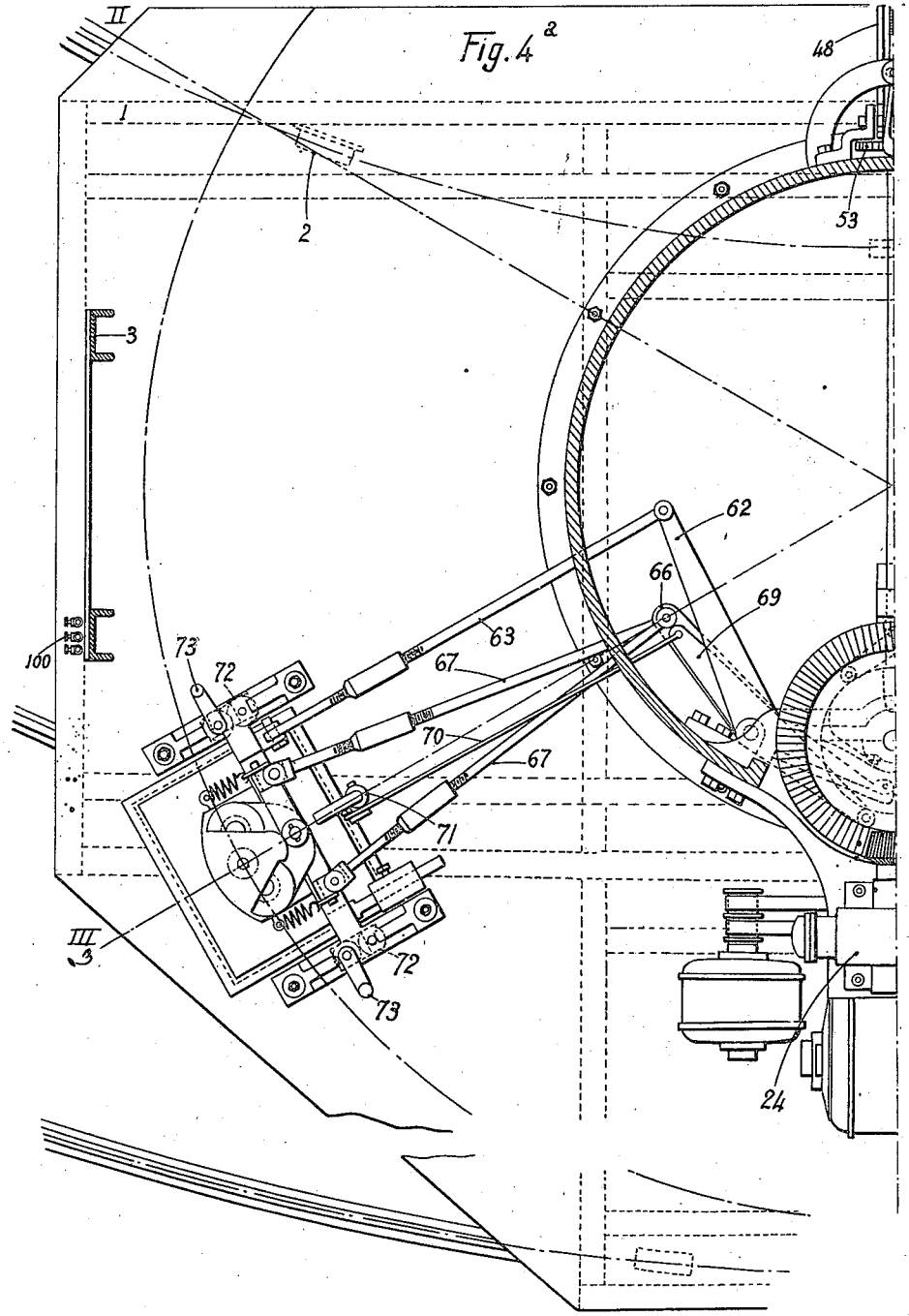

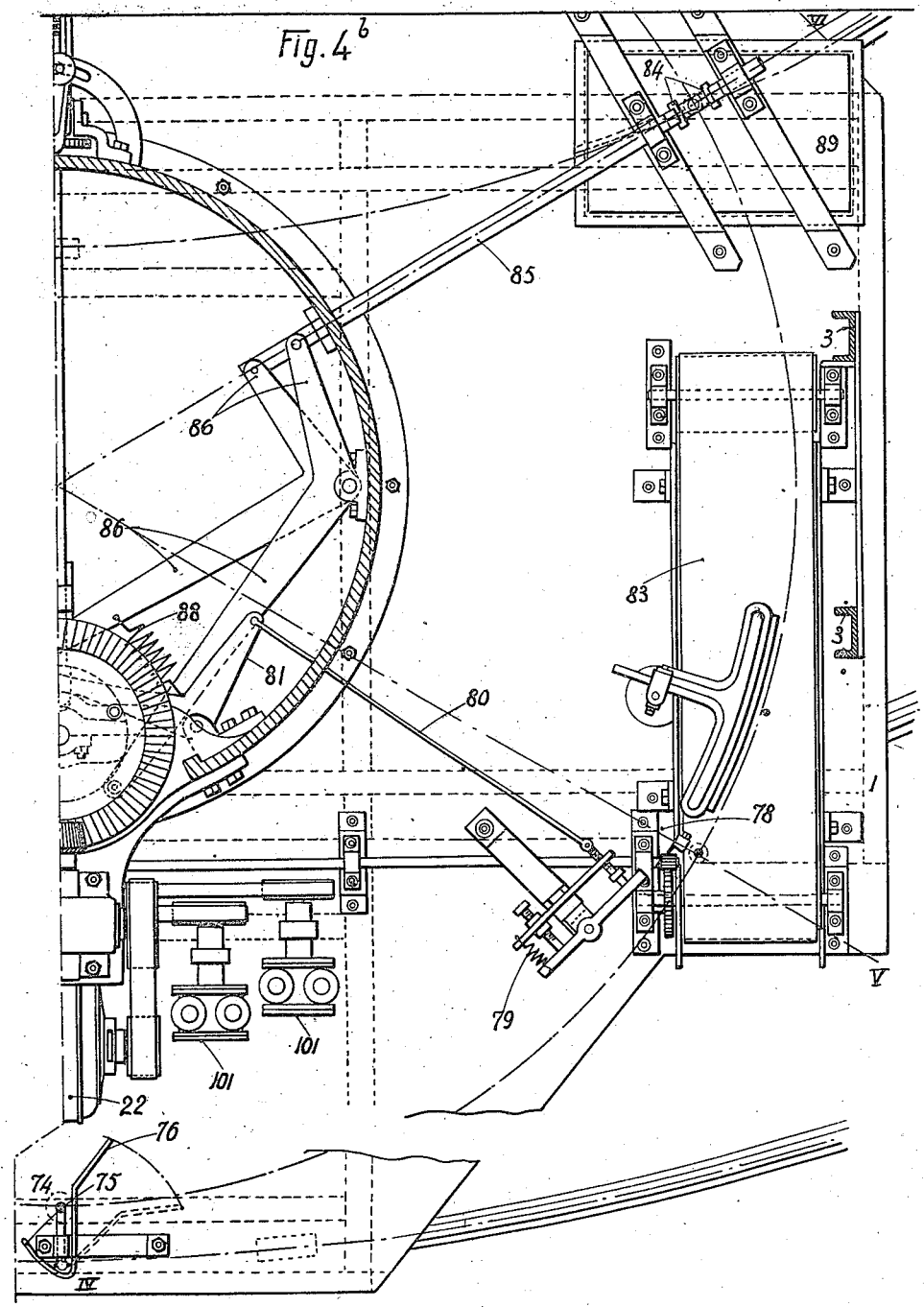

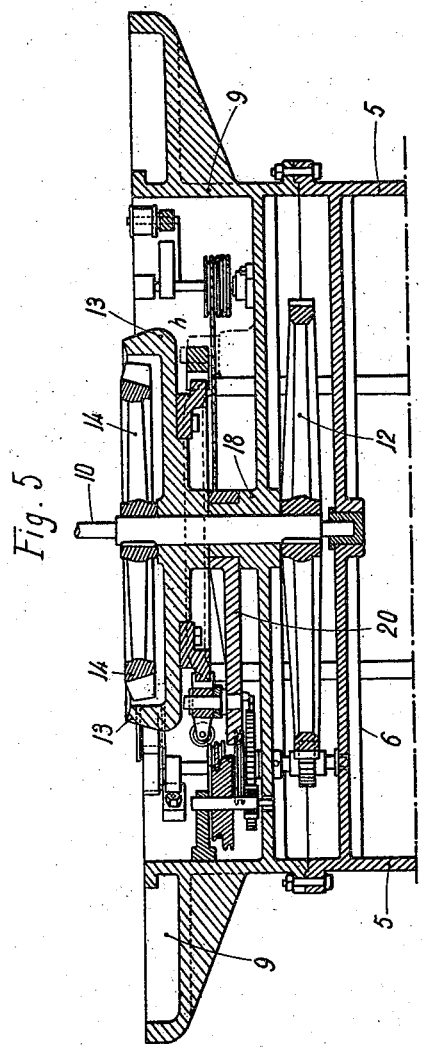

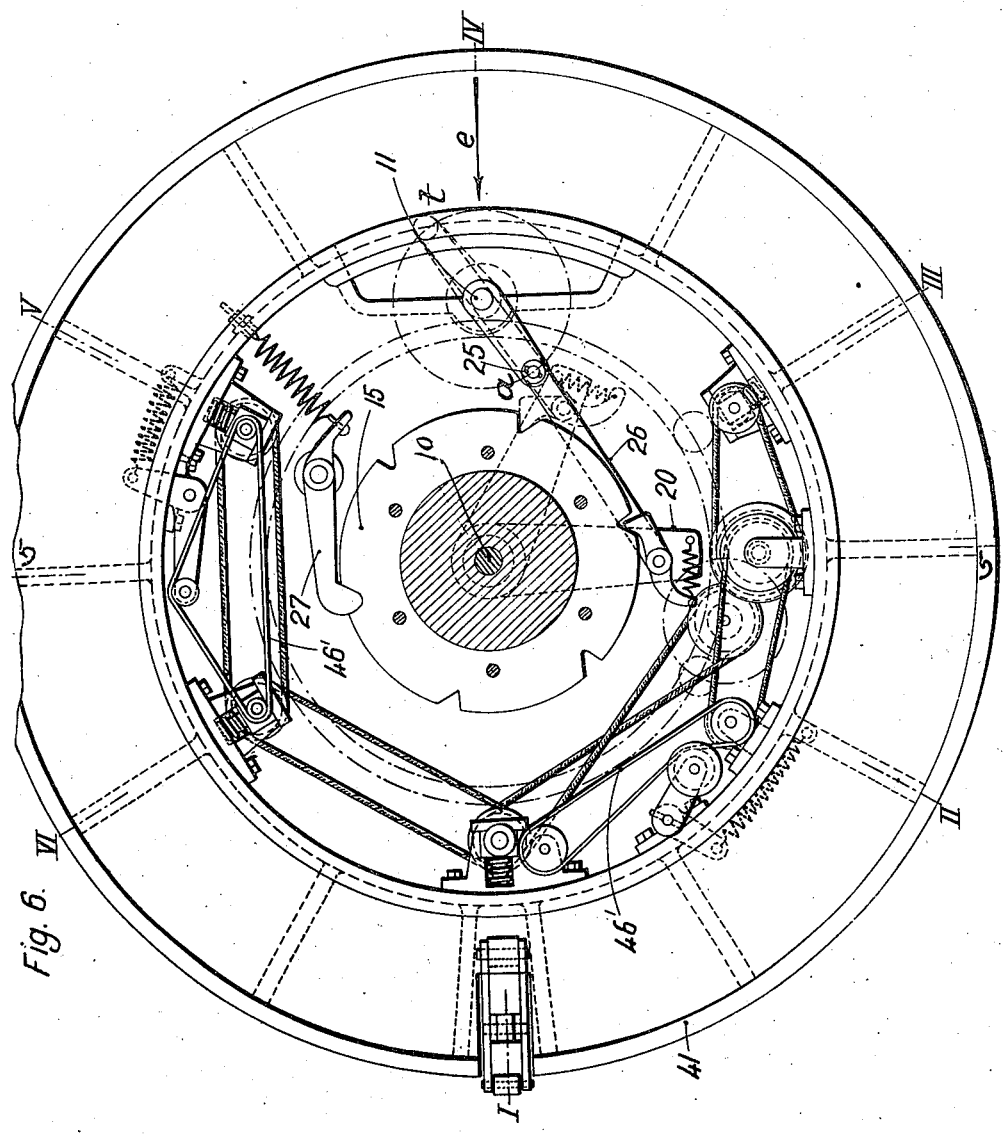

E. LECOULTRE.
AUTOMATIC MACHINE FOR BLOWING GLASS.
APPLICATION FILED DEC. 27, 1919.
1,401,713.
Patented Dec. 27, 1921.
14 SHEETS—SHEET 11.
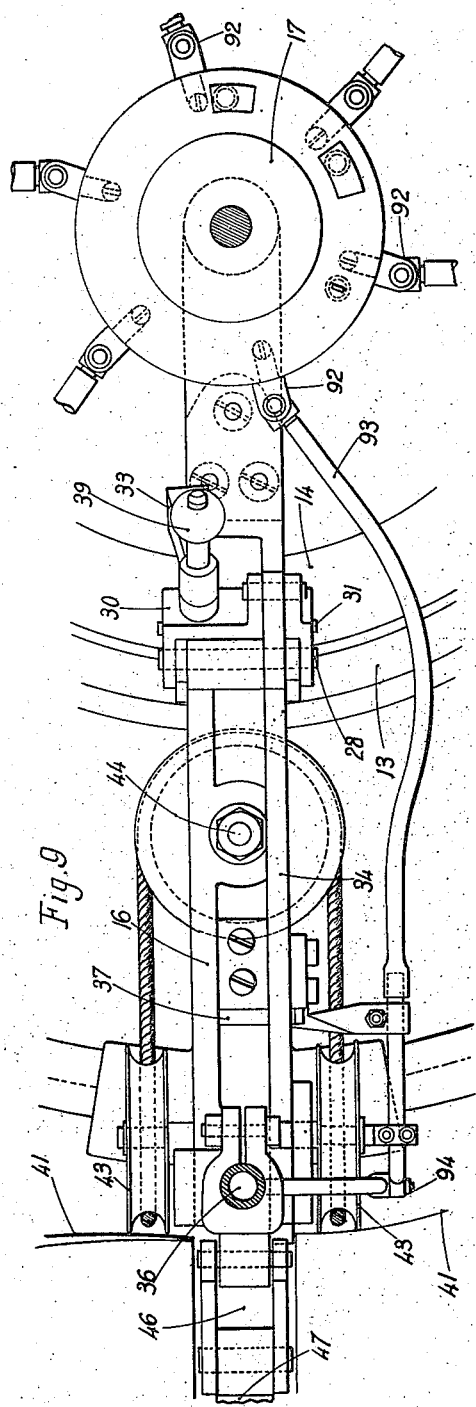
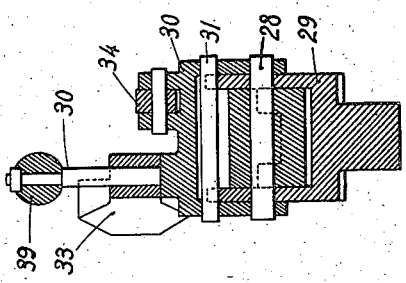
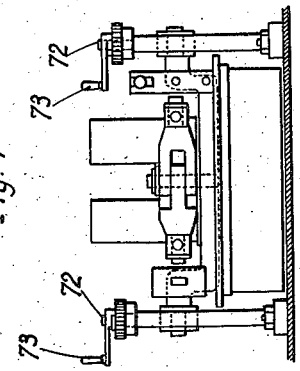
Inventor.
Ernest Lecoultre
by Chas. J. Neill
Atty

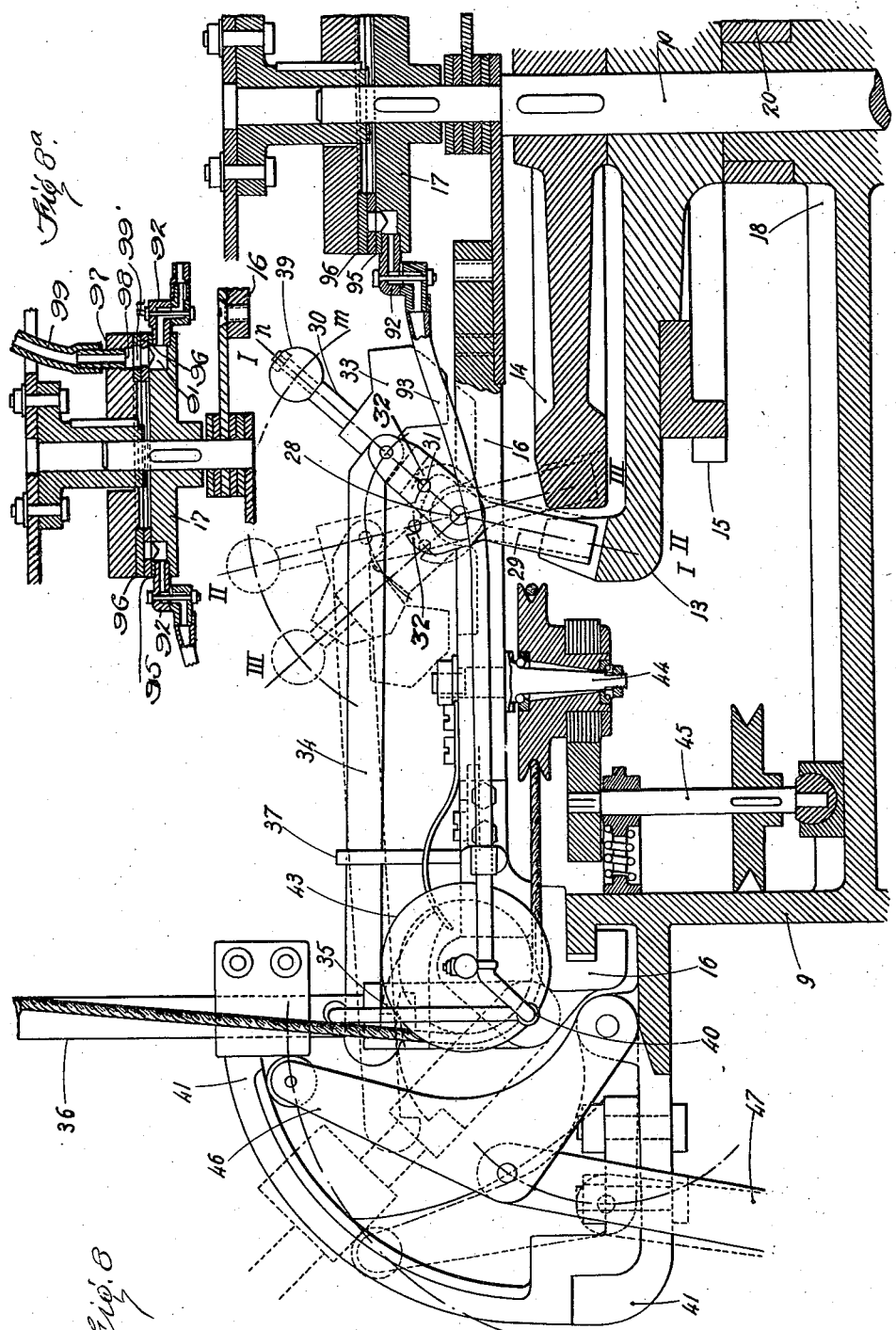

E. LECOULTRE.
AUTOMATIC MACHINE FOR BLOWING GLASS.
APPLICATION FILED DEC. 27, 1919.
1,401,713.
Patented Dec. 27, 1921.
14 SHEETS—SHEET 13.
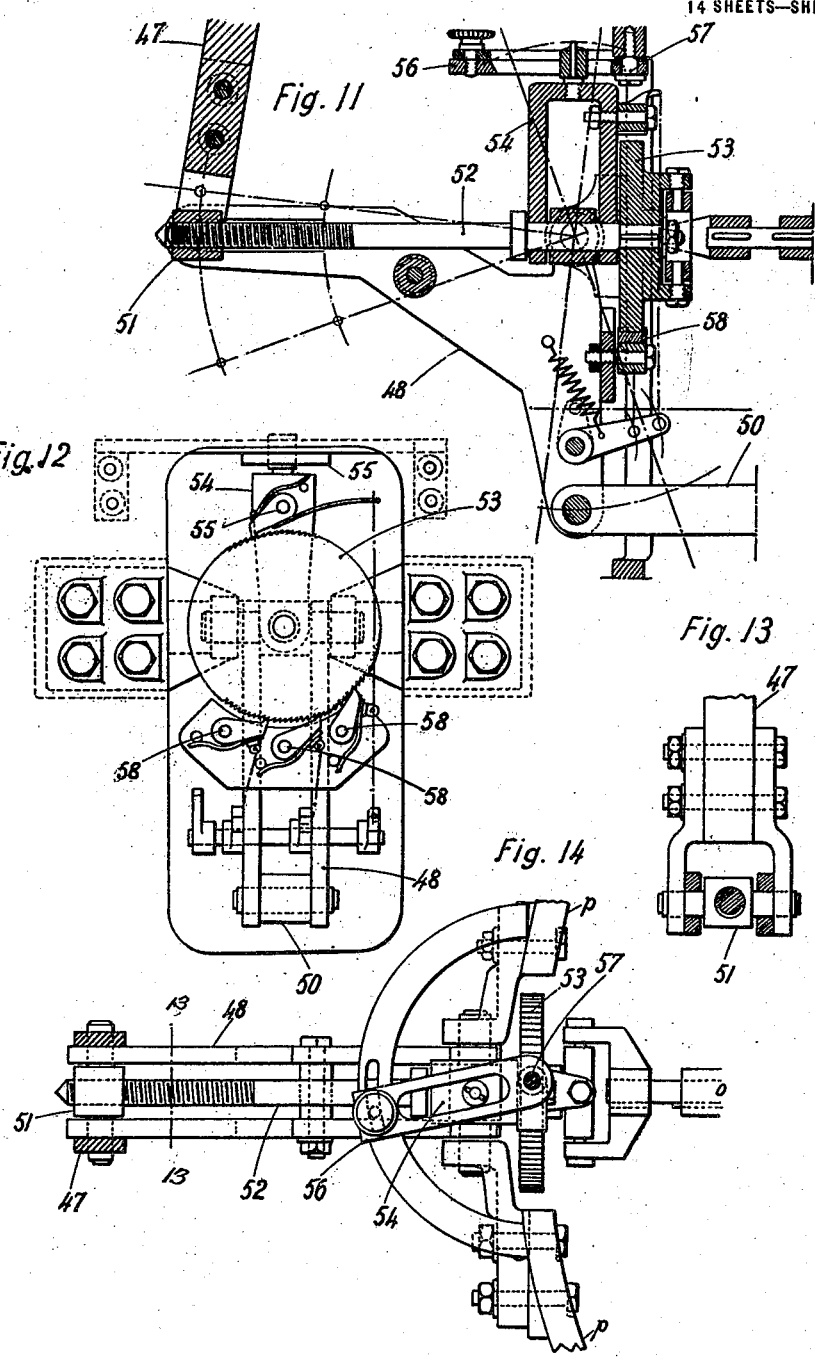

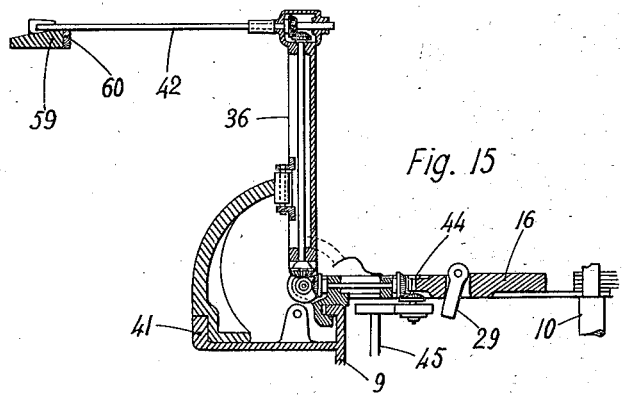

UNITED STATES PATENT OFFICE.

ERNEST LECOULTRE, OF PARIS, FRANCE, ASSIGNOR TO COMPAGNIE GENERALE D'ELECTRICITE, OF PARIS, FRANCE, A FRENCH CORPORATION.

AUTOMATIC MACHINE FOR BLOWING GLASS.

1,401,713.  Specification of Letters Patent.  Patented Dec. 27, 1921.

Application filed December 27, 1919. Serial No. 347,836.

*To all whom it may concern:*

Be it known that I, ERNEST LECOULTRE, citizen of Switzerland, residing at Paris, Department of the Seine, in France, (having P. O. address 54 Rue La Boëtie, in the said city,) have invented certain new and useful Improvements in Automatic Machines for Blowing Glass, (for which I have filed applications in Italy November 13, 1918, in France March 28, 1919, Patent No. 504,035, and in Belgium December 4, 1919,) of which the following is a specification.

The subject of the present invention is an entirely automatic machine which effects all the operations ordinarily executed manually by glass blowers as well as certain other supplementary operations.

The accompanying drawings show by way of example a construction of machine according to the invention.

Figure 1 is a vertical section of the machine and part of the glass furnace on the line 1—1 of Fig. 2.

Fig. 2 is a plan view, the upper table of the machine frame being removed.

Fig. 3 is a part vertical section on the line 3—3 of Fig. 2.

Fig. 4 is a horizontal section on the line 4—4 of Fig. 1.

Fig. 5 is a vertical section of the body of the machine on the line 5—5 of Fig. 6, looking in the direction of the arrow *e*.

Fig. 6 is a horizontal section of the body of the machine on the line 6—6 of Fig. 5.

Fig. 7 is a view of the mold elevating mechanism on the line 7—7 of Fig. 3.

Fig. 8 is a view of a rotary arm carrying a blow tube with a section of the upper part of the body of the machine and of the air distributer.

Fig. 8ª is the upper right hand portion of Fig. 8 broken away.

Fig. 9 is a plan view of a rotary arm and the air distributer, the latter being seen at the level of the line 9—9 of Fig. 8.

Fig. 10 is a transverse section of a rotary arm on the line 10—10 of Fig. 8.

Fig. 11 is a vertical section of the device for regulating the gathering operation on the line 11—11 of Fig. 14.

Fig. 12 is a vertical section of said regulating device on the line 12—12 of Fig. 14.

Fig. 13 is a vertical section of the end of the lever of said regulating device on the line 13—13 of Fig. 14.

Fig. 14 is a plan view of said regulating device.

Fig. 15 is a diagrammatic view showing the position occupied by the blow tube during the marvering operation relatively to the rotary arm. In this figure as in Figs. 16, 17 and 18 there is illustrated a modified construction in which the transmission of rotary movement to the blow tube is effected by gearing.

Fig. 16 is a diagrammatic plan of Fig. 15.

Fig. 17 is a diagrammatic view showing the positions occupied by the blow tube during the swinging of the glass which has been gathered.

Fig. 18 is a plan view of Fig. 17.

Like reference numerals denote like parts in the several views.

The machine as a whole is mounted on a frame 1 (Figs. 1 and 2) of channel iron fitted with wheels 2 so as to be able to travel on rails around a glass furnace and may be conveniently stationed in front of one or other of the pots.

Upstanding from the frame are two side pillars 3 on which rests a horizontal table 4 extending above the machine.

The main body of the machine comprises two cylindrical castings bolted together in superposed relationship.

The upper casting 9 merges into a large circular plate having two concentric tracks 41 and 41' which serve to guide radial arms mounted for pivotal movement around the axis common to the cylinders.

Two main shafts 10 and 11 are operatively connected by gearing 12 the ratio of which is as the number of radial arms; that is to say, for one rotation of the central shaft 10 the cam shaft 11 will perform a number of revolutions equal to the number of arms.

Besides the spur wheel 12 the central shaft carries two other wheels 13 and 14 shown in Figs. 1 and 8. The wheel 13 turns freely on the shaft and has on its under side a series of teeth constituting a ratchet wheel 15.

The wheel 14 is keyed to the shaft 10.

On the said shaft 10, immediately above the wheels 13 and 14, are pivotally mounted a number of radial arms 16, above which is keyed to the shaft the air distributer disk 17.

On the boss of a bearing or partition plate 18 is pivoted a lever 20 forming an element constituting an actuator for the ratchet wheel 15.

The cam shaft 11, from which are derived all the movements of the machine, is actuated by the motor 22.

On the upper end of the shaft 11 is keyed a crank 25 which actuates the wheel 13 by means of the connecting rod 26, the lever 20 and the ratchet mechanism referred to above. The wheel 13, which, as already stated, turns freely on the shaft 10, is detained temporarily in each of the successive stations occupied by the detent 27.

As is evident, the wheel 13 receives intermittent rotary movements, its angular speed depending on the number of ratchet teeth. For each rotation of the cam shaft 11 the wheel 13 will advance to an extent of one ratchet tooth, and, consequently, if the number of teeth be equal to the number of radial arms, the wheel 13 will perform intermittently the same number of rotations as the wheel 14 keyed to the central shaft.

By making the length of the crank 25 just sufficient for the lever 20 to engage one after another the teeth on the wheel 13, the duration of each of the periods of rest of the wheel 13 will be almost equal to half the duration of a rotation of the cam shaft. In effect there will be a rotation of the wheel 13 during a semi-rotation of the crank 25 from $a$ to $t$ (Fig. 6) and an interval of rest during the other semi-rotation, that is, from $t$ to $a$. By increasing the length of the crank the lever 20 will pass beyond the following interdental space and only in its return will it come into operative engagement with the ratchet wheel. The duration of the period of rest may then be greater than half the duration of a rotation of the cam shaft.

Analysis of the different operations necessary for the manufacture of articles of blown glass has demonstrated the necessity of having during the said operation the supports for the blow tubes alternately in motion and at rest. This result is obtained by the employment of radial arms mounted for pivotal movement around an axis independently of each other and adapted to be coupled in alternation to the wheels 13 and 14 of which the latter performs a uniform and continuous movement of rotation and the former an intermittent movement.

The description of the mechanical coupling system selected for the machine represented is described in detail.

Reference will now be made to Figs. 1, 2, 8, 9 and 10.

Fitted to each of the arms 16 about midway of the length thereof is a small horizontal shaft 28 on which are free to oscillate two levers 29 and 30. The depending lever 29 is confined to move between a position in which it engages the wheel 13 and a position in which it engages the wheel 14.

The upwardly extending lever 30 moves in an arc larger than the arc of the lever 29, and is provided with a pin 31 which abuts against the lugs 32 on the boss of the lever 29 and thus imparts movement to the latter. The lever 30 carries a pivotally mounted eccentric counterweight 33 such as is applied to levers for operating railway points. In lieu of a counter-weight, a spring may be employed. To the lever 30 is connected by means of a pin the bar 34 terminating in a hook engageable with a projection 35 on the shoulder of the forearm 36 just when the latter is lowered into the pot to gather the glass. The lever 30 is thus brought from position I to position II (Fig. 8). At this moment the projection 35 leaves the hook in consequence of its being lowered; while the bar 34 rests on the support or guide 37. The fore-arm 36 may then continue to descend alone.

Due to the action of the counterweight 33 on the lever 30 the pin 31 presses on the lug 32 of the lever 29 to rock the lever 29 from left to right (see Fig. 8). The lever 29 will thus first occupy the position II indicated in dotted lines in Fig. 8. The movement of the levers is completed, that is to say, the levers 30 and 29 assume the position III at the moment when an interdental space of the wheel 14 passes in front of the interdental space of the wheel 13 engaged by the lever 29. The radial arm 16 thus remains coupled to the uniformly rotating wheel 14 and will so remain until just before the position III (Fig. 2) where there is effected the inversion of the coupling operation. To effect such inversion of the coupling operation, the inward movement of the lever 30 is effected by a cam 38 fixed to the table 4 and tracked by the roller 39 at the upper end of the lever 30. The coupling lever 29 again finds itself in the same interdental space of the wheel 13 from which it was disengaged in the position I at the moment of gathering the glass.

As has been seen, each of the fore-arms 36 is articulated on a horizontal axis to the extremity of a radial arm 16 so as to be free to rock in a vertical plane containing the axis of the shaft 10. At a point about one-third of the length measured in the direction from the pivotal axis 40 they engage the cam-track 41. At the extremity of each fore-arm 36 and at right angles to its axis, in a vertical plane, is a blow-tube 42 (Fig. 1) mounted on ball bearings or other form of bearings.

With the arrangement described above the blow-tube may pass from a vertical position to a horizontal position or inclined position (Fig. 1) which renders possible the gathering of the molten glass in a pot of any type, as will be seen later.

The blow-tube may receive movement of rotation by means of a cord transmission as indicated, for example, in Figs. 1, 2, 8, etc., ... for gearing as shown in Figs. 15, 16, 17 and 18. The pulley 43 receives a rotary movement the speed of which changes at localities where the arm comes to rest or which it passes in its rotation around the axis 10.

For this purpose there are provided at the said localities interponents 45 driven at the desired speed and arranged to transmit their movement by friction or through gearing to a pulley of the train connected by a cord to a pulley at the end of the fore arm 36.

When it is necessary that during the displacement of the arm there should also be rotation of the tube there is provided a belt 46′ for transmitting rotary movement or a chain drive may be substituted.

The interponents 45 may derive their rotation from the shaft 10 or from the motor. In the machine represented there is provided a transmission by means of gears combined with cords.

The initiation of the action of the said members may be effected by the cam shaft. For example, the interponent 45 located at the molding station may be provided with a clutching and de-clutching mechanism which permits of effecting the rotation of the blow-tube only after the blown glass has been sufficiently elongated and is in a position axially of the mold.

It has been pointed out above that the position of the blow-tube is determined by the outer track 41. In front of the furnace and to permit the gathering of the glass this track has a deep notch. In the latter is disposed the extremity of the lever 46 against which bears the blow-tube-carrying fore arm. This lever 46 temporarily acts as a substitute for the track 41, i. e., sustains the fore-arm and determines its position.

The said lever 46 through the intermediary of the links 47 and 50 (Fig. 1) and of a bell-crank lever 48 is actuated by a cam 49 mounted on the cam shaft 11. The lowering of the blow tube into the pot depends therefore on the form on the cam 49. To effect constant gathering, the depth which the tube is introduced into the pot ought to increase in proportion as the level of molten glass falls. For this purpose one of the arms of the lever 48 increases constantly in length, that is to say, increases after each gathering operation. This result is obtained in the following manner; (see Figs. 11, 12, 13, 14). The means of attachment of the link 47 comprises a nut 51 guided in a slot and actuated by a screw 52 carrying a ratchet wheel 53. The arm 54, which is mounted for pivotal movement around the axis of the screw 52, and which carries the feed pawl 55, is guided in a slot in the member 56, which, in turn, is mounted for movement in a horizontal plane around its pivot 57. Depending on the inclination of the axis of the last named slot to the vertical plane containing the path of the screw 52 functioning as a cranked lever and consequently also the arm 54, the latter will turn more or less around the axis of the screw 57, that is, will feed the ratchet wheel more or less.

It will thus be seen that by displacement of the member 56 there may be regulated at will the amount gathered; that is to say, the amount may be as desired and maintained steady, during the operation of the machine.

The rolling of the glass gathered on a suitable surface with the object of distributing it suitably around the blow tube and the marvering are effected as follows:—At the moment when the blow tube, after the gathering operation, has assured a horizontal position, the radial arm 16 which carries the tube is coupled to the continuously rotating wheel 14. The fore-arm 36 continues in its course, being guided by the outer track 41, and the blow tube, maintained in its horizontal position, is disposed radially of the axis of rotation. If now, in these conditions, a movement of rotation be imparted to the blow-tube and there being an arcuate guide surface 59 concentric with the circular arc traversed by the end of the blow tube there will be effected the desired rolling and distribution of the glass.

The movement of rotation of the blow tube is derived from the belt $46^1$ as above explained.

Disposed concentrically with the rolling surface, slightly nearer the center of the machine and at a distance, measured vertically, equal to the thickness to be given to the glass around the blow tube, is a track 60 against which the blow tube bears. This vertical distance diminishes as the blow tube advances, that is as the mass gathered is distributed uniformly around the tube and as its thickness is diminished. The rolling surface form, relatively to the principal axis of the machine, a conical surface which is very flat at the commencement but the inclination of which increases toward the end. A thrust is thus applied to the glass toward the extremity of the tube, effecting uniform distribution.

The swinging of the blow tube to effect elongation of the material is effected as follows:—The marvering being completed, the blow tube shifts rapidly from horizontal position to vertical position due to the continuation of the rotation of the radial arm which remains coupled to the uniformly rotated wheel 14.

The fore-arm 36 guided by the outer track 41 follows the contour of the latter which effects the lowering operation.

In continuing its travel the fore-arm arrives at a region of the slideway where the contour is sinusoidal, and receives a vertical oscillatory movement on its pivot 40. The blow tube, which is at right angles to the end of the fore-arm, and to the extremity of which is attached the glass, will receive a movement which is neither vertical nor horizontal but which fluctuates between two angles, for example a and b of Fig. 17.

For the molding operation the following mechanism is provided.

While the radial arms are moving uniformly from position II to position III or during the period when the swinging of the tube takes place, the roller 39 of the lever 30 engages the cam 38 which is so curved that the lever is shifted toward the center, moving with it in the same direction the counterweight 33. The lever 29, which engages one or other of the interdental spaces of the wheels 13 and 14, as explained above, cannot be displaced, but under the action of the counterweight 33 it passes from one wheel to another at the moment when the corresponding interdental spaces come opposite one another. The radial arm in question which is freed from the continuously moving wheel 14 is coupled to the intermittently movable wheel 13 and remains in position III during the entire period of arrest, at which time the molding operation takes place.

The mold 64 may be substantially like the ordinary molds which the blowers of bulbs manipulate with their feet. When at rest it is inverted in a vessel of water. At the desired moment, that is to say, as soon as a radial arm has attained the position III, a cam 61 acting through the intermediary of the lever 62 and rods 63 (Fig. 4) causes the lifting of the mold which is positioned, open, axially of the blow tube. Another cam 65 acting through the intermediary of the lever 66 and rods 67 effects the closure of the halves of the mold.

At this moment there takes place also the introduction of air into the article to be molded for the time desired and under the desired pressure.

A third cam 68 acting through the lever 69 and rod 70 opens a cock 71 which permits the passage of a jet of air serving to cool the glass outside the mold.

After the time required for the article to be molded the said cams reproduce in the desired order the reopening of the mold and its inversion into the vessel of water, and, finally, at the last moment, only after the blow tube has left the position III the cock 71 is closed.

All the mechanism for manipulating the mold may be raised or lowered by means of screw 72 and handle 73 in order to lift the mold to the desired elevation relatively to the blow tube.

The piercing of the bulb for an electric lamp in order to fit thereto a tube for evacuation purposes is effected as follows:

In the position IV and precisely in the line of the axis of the blow tube is a blow-pipe 74 having a very pointed flame (Figs. 1 and 4), the said blow-pipe being directed upwardly and regulated in such wise as to heat the pip of the bulb. Also, in this position IV the radial arm carrying the blow tube is in communication with a source of air under pressure permitted to pass by the distributing device referred to above. The interior of the bulb is then subjected to such pressure and when the pip has been sufficiently softened by the blow-pipe the piercing of the bulb is effected. The flame of the blow-pipe is usually extinguished by the jet of air which issues from the pierced bulb.

It is relit automatically by an igniter 75 which the blow tube, at the moment of leaving the position IV, brings axially of the blow-pipe. This movement is brought about by means of the cranked lever 76 which is fixed on the shaft 77 as is also the igniting tube 75. The blow tube, in passing, causes the assembly to turn on the axis 77, and after the blow tube has passed the lever arm 76 the latter is restored to initial position by a spring.

The operation of cutting off the finished article is effected in position V. It may be effected in various ways. It is facilitated by reason that the finished article arrives at a determined position and may be subjected by the blow tube to the desired movement of rotation. There may then be brought to the required position a cutting instrumentally, for example a diamond, a piece of steel or cold or moist material which causes the glass to crack off when contacted.

A cam may also liberate a lever which presses against the blown article or strikes it against the tube so as to effect the disengagement of the article from the blow tube.

The blown article falls into a suitable receptacle or on an apron 83 which collects the articles and leads them off to a distance from the machine (Figs. 1 and 3).

In position VI there is effected the operation of cleaning the end of the blow tube which assumes a position between the two jaws 84. The latter are actuated through the intermediary of the rods 85 and levers 86 by cams 87 and spring 88. These jaws open and close abruptly on the end of the blow tube with a frequency dependent on the contour of the cams 87. The jaws may also be actuated through the intermediary of a transmission device furnished with a coupling sleeve adapted to be clutched and declutched and set in movement or brought to rest by a cam at the opportune moment.

During this operation and so long as the blow tube remains in position VI there may be directed against it a jet of fresh air or water in order to facilitate the detachment of the glass and to cool the tube as far as may be judged necessary.

The air distributing mechanism (Figs. 8 and 9) is constructed as follows:—

On the shaft 10 is keyed a disk 17 which has on its upper face corresponding to each of the radial arms cavities 91 which communicate by way of ports with articulated connections 92 located on the periphery of the disk 17.

Each of these tubular connections is in communication with the bore of the corresponding blow tube by way of the flexible tube 93, the articulated tube 94 and the fore-arm which is formed hollow, and finally by way of apertures formed in the bearing for the blow tube.

On the disk 17 is fixed an annulus 95 on which latter bears a second annulus 96 secured to a disk 97 fixed to the upper frame of the machine.

On the lower face of the stationary disk 97 are cavities 98 communicating with the tubular connections 99.

The cavities 98 of the stationary disk 97 are in positions corresponding to the positions occupied by the blow tubes when the latter ought to receive air.

These cavities 98 are independent of each other and consequently each of them may, when necessary, be put in communication with the source of pressure medium or the source of air appropriate for the operation being performed or may be in communication with a suction device to effect suction for the purpose of gathering the glass or for any other operation.

The annuli 95 and 96 are formed with radial slots which determine the quantity of air to be admitted and the direction of such admission. In practice, the lower annulus 95 performing a uniform rotary movement in bearing contact with the fixed upper annulus uncovers and covers the ports 99' which permits passage of air from one disk to the other.

The different pressures to be established in the cavities 98 of the upper disk 97 may be realized by the employment of independent sources of air under pressure or by regulating the extent of opening of a valve located in the inlet pipe, the regulation of such valve being effected automatically by a cam. The sources of compressed air may be compressors or fans mounted on the machine or cylinders with pistons or blowers actuated by one or more cams, the latter being mounted on the cam shaft, or other air connections may be employed.

The operation is as follows.—

The machine is assumed to be disposed in front of and adjacent to the opening of the glass furnace.

As all the radial arms carrying blow tubes 70 are subjected to the same movements in the same order, there will be considered in the following description only the operation of one of these arms, starting from the position VI, that is to say where the cycle of operations has been completed.

The motor is running. The arm which is considered as starting from the position VI is coupled to the intermittently rotated wheel and is brought to the position I. In its travel from the position VI to the position I, due to the contour of the track 41, the blow tube is shifted from the vertical position which it occupied to the horizontal position.

In position I the fore-arm 36 leaves the track 41 and rests against the lever 46. The latter is lowered under the action of the cam 49 so that the fore-arm and the blow tube are lowered, the blow tube dipping into the interior of the pot.

It has been seen that in position I the blow tube is subjected to a movement of rotation derived. The blow tube dips slightly into the molten glass, gathering a certain quantity.

The cam 49, continuing to act, lifts the fore-arm and at the moment when the latter has assumed a vertical position the arm 16 is coupled to the uniformly rotating wheel 13 and partakes of its movement.

The extremity of the blow tube carrying the gathered glass passes the guide surface 59 on which the marvering is effected.

Starting now from the postion II the track 41 effects the rapid lowering of the fore-arm, and continuing its course without being arrested the arm traverses the sector between position II and position III where swinging is effected.

Shortly before arriving at the position III the cam 38 engaged by the roller of the lever 30 reverses the latter so as to effect the change of the coupling. Starting from this moment, the rotary arm is coupled to the intermittently rotated wheel.

In the first stop at position III the molding operation is effected while the blow tube is rotated and air is introduced into the article to be molded. The mold, which is normally inverted in a vessel of water, is lifted therefrom at the desired movement by the action of cams and levers, the mold being finally restored to initial position.

The molding operation being completed, the blow tube passes to the position IV where the piercing of the bulb is effected in the manner described above.

In position V the blown article is detached from the tube and falls on the traveling apron 83 which delivers it to a box.

Finally, in the position VI, where the last stop takes place, the blow tube is rid of glass residues which are still attached to it, and cooled, if necessary.

The cycle of operations is thus closed. It recommences without interruption the same for each of the rotary arms.

Having now particularly described and ascertained the nature of this invention and in what manner the same is to be performed, I declare that what I claim is:

1. In an automatic machine for the manufacture of articles of blown glass, the combination with a main support, of a series of radial arms, means for mounting said radial arms for a bodily revolving movement around a common axis independently of each other, means for individually pivoting said arms for vertical movement, and means for operating said arms whereby the same are caused to perform their various movements.

2. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a track for supporting and guiding said forearms, said track being constructed with the desired contour, whereby the angular movement in a vertical plane of each of said forearms will be effected by the variations of said contour, and means for operating said arms whereby the same are caused to perform their various movements.

3. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, and means for causing an alternating intermittent and continuous operation of said arms during their movements around their common axis.

4. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a blow tube secured to each of said forearms adapted to be dipped into a glass pot, a track for supporting and guiding said forearms, said track being constructed with means for raising and lowering the forearms to permit the blow tube to be inserted into the glass pot and raised therefrom, and means for causing an alternating intermittent and continuous operation of said arms during their movements around their common axis.

5. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a blow tube secured to each of said forearms adapted to be dipped into a glass pot, a track for supporting and guiding said forearms, said track being constructed with means for raising and lowering the forearms to permit the blow tube to be inserted into the glass pot and raised therefrom, means for regulating the depth of the successive blow tubes into the pot, the extent of said dipping being progressively increased in proportion to the fall of level of the glass in said pot, and means for causing an alternating intermittent and continuous operation of said arms during their movements around their common axis.

6. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a blow tube secured to each of said forearms adapted to be dipped into a glass pot, a track for supporting and guiding said forearms, said track being constructed with means for raising and lowering the forearms to permit the blow tube to be inserted into the glass pot and raised therefrom, means for regulating the depth of the successive blow tubes into the pot, the extent of said dipping being progressively increased in proportion to the fall of level of the glass in said pot, means for rolling the glass around the blow tubes, means for individually rotating said blow tubes, and means for causing an alternating intermittent and continuous operation of said arms during their movements around their common axis.

7. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a blow tube secured to each of said forearms adapted to be dipped into a glass pot, a track for supporting and guiding said forearms, said track being constructed with means for raising and lowering the forearms to permit the blow tube to be inserted into the glass pot and raised therefrom, means for regulating the depth of the successive blow tubes into the pot, the extent of said dipping being progressively increased in proportion to the fall of level of the glass in said pot, means for rolling the glass around the blow tubes, means for individually rotating said blow tubes, means for distributing air under pressure to the blow tubes, said distribution being effected at different pressures or the air being derived from several sources corresponding to the various positions of the radial arms carrying said blow tubes, and means for causing an alternating intermittent and continuous operation of said arms during their movements around their common axis.

8. In an automatic machine for the manufacture of articles of blown glass, the combination with a main support, of a series of radial arms, means for mounting said radial arms for a bodily revolving movement around a common axis independently of each other, means for individually pivoting said arms for vertical movement, a continuously operated member and an intermittently operated member for controlling the movements of said radial arms, automatic means for alternately connecting the individual arms to said continuously and intermittently operated means, and means for controlling said operated members.

9. In an automatic machine for the manufacture of articles of blown glass, the combination with a main support, of a series of radial arms, means for mounting said radial arms for a bodily revolving movement around a common axis independently of each other, a forearm pivotally carried by each of said arms for vertical movement, a blow tube secured to each of said forearms adapted to be dipped into a glass pot, a track for supporting and guiding said forearms, said track being constructed with means for raising and lowering the forearms to permit the blow tube to be inserted into the glass pot and raised therefrom, means for regulating the depth of the successive blow tubes in the pot, the extent of said dipping being progressively increased in proportion to the fall of level of the glass in said pot, means for rolling the glass around the blow tubes, means for individually rotating said blow tubes, means for distributing air under pressure to the blow tubes, said distribution being effected at different pressures or the air being derived from several sources corresponding to the various positions of the radial arms carrying said blow tubes, a continuously operated member and an intermittently operated member for controlling the movements of said radial arms, automatic means for alternately connecting the individual arms to said continuously and intermittently operated members, and a motor and associated gearing connected with said operated members for driving said members.

In testimony whereof I have hereunto set my hand in presence of two subscribing witnesses.

ERNEST LECOULTRE.

Witnesses:
HENRY T. WILCOX,
EMILE KLOK.